United States Patent [19]

Kosarski, Jr. et al.

[11] Patent Number: 4,679,397
[45] Date of Patent: Jul. 14, 1987

[54] HYDRAULIC POWER BRAKE APPARATUS

[75] Inventors: Raymond Kosarski, Jr., Niles, Mich.; Robert W. Jackson, South Bend, Ind.

[73] Assignee: Allied Corporation, Morristown, N.J.

[21] Appl. No.: 787,817

[22] Filed: Oct. 15, 1985

[51] Int. Cl.$^4$ ............... B60T 11/20; B60T 13/58; B60T 17/00; F15B 3/00
[52] U.S. Cl. ............................. 60/562; 60/563; 60/565; 60/579
[58] Field of Search .......... 60/548, 562, 579, 547.3, 60/405, 589, 565, 563; 91/519

[56] References Cited

U.S. PATENT DOCUMENTS

| | | | |
|---|---|---|---|
| 2,136,835 | 11/1938 | Begg | 60/589 |
| 2,332,301 | 10/1943 | Cox | 60/589 X |
| 2,499,845 | 3/1950 | Butler | 60/579 X |
| 2,526,968 | 10/1950 | Pontius | 60/579 X |
| 2,597,404 | 5/1952 | Teske | 60/579 X |
| 2,870,605 | 1/1959 | Forster | 60/548 |
| 3,354,638 | 11/1967 | Kersting | 60/562 X |
| 3,590,689 | 7/1971 | Brewer et al. | 60/405 X |
| 3,640,067 | 2/1972 | Ingram | 60/579 X |
| 3,699,680 | 10/1972 | Shellhause | 60/548 X |
| 3,733,817 | 5/1973 | MacDuff | 60/548 X |
| 3,939,658 | 2/1976 | Horvath | 60/548 |
| 4,007,593 | 2/1977 | Baker | 60/405 X |

Primary Examiner—Robert E. Garrett
Assistant Examiner—George Kapsalas
Attorney, Agent, or Firm—Larry J. Palguta; Ken C. Decker

[57] ABSTRACT

The hydraulic power braking apparatus comprises a fluid power apparatus (10) receiving fluid pressure from a power steering apparatus of the vehicle, the fluid power apparatus (10) connected at one end to the brake pedal of the vehicle and at the other end to a master cylinder (110). The master cylinder (110) is connected to a fluid displacement multiplier (210), fluid pressure developed by the master cylinder being communicated to the fluid displacement multiplier (210). The fluid displacement multiplier (210) comprises a housing (212) having therein a stepped chamber (211) with a differential area piston (213), the differential area piston (213) having a through passage (240) controlled by a poppet valve (250). A fluid pressure line (31) communicates the working chamber (18) of the fluid power apparatus (10) with a variable volume chamber (290) of the displacement multiplier (210) so that when actuation of the brake system causes operation of the fluid power apparatus (10), fluid pressure in the working chamber (18) is communicated directly to the displacement multiplier (210) in order to provide an additional fluid power boost to the differential area piston (213) activated by output fluid pressure received from the master cylinder (110).

5 Claims, 3 Drawing Figures

HYDRAULIC POWER BRAKE APPARATUS

BACKGROUND OF THE INVENTION

1. Field of the Invention

The present invention relates to a hydraulic power braking apparatus which utilizes fluid pressure from the working chamber of a fluid power apparatus attached to the master cylinder to provide a power boost to the piston of a displacement multiplier connected to the master cylinder, in order to increase the output pressure communicated by the multiplier to an associated brake circuit.

2. Description of the Prior Art

Recent off-road and on-road vehicle designs have required that braking systems accomplish braking within a predetermined distance. In order to accomplish this, larger brake assemblies have been utilized. These larger brake assemblies require additional fluid volume to ensure effective application of the brakes. In order to provide the additional brake fluid required by the larger brake assemblies, the master cylinder may be modified by lengthening the stroke, increasing the bore diameters, and using various volume intensifier devices in order to provide the required larger volume displacement. Rather than altering the size and dimensions of present master cylinders and associated equipment, it is preferable to utilize existing master cylinders to effect the higher fluid volume displacement requirements of the larger assemblies. The present invention solves this problem by providing a fluid displacement multiplier that receives fluid pressure from a fluid power apparatus connected to and activating the master cylinder assembly.

SUMMARY OF THE INVENTION

The present invention comprises a power braking apparatus for a vehicle comprising a master cylinder having a reservoir and a fluid pressure outlet, the master cylinder being activated by a fluid power apparatus attached thereto. The fluid power apparatus comprises a housing, an input rod, a first chamber and a work chamber divided by a power piston, a spring biasing the piston, a fluid power inlet, a fluid power outlet, passage means through the piston and valve means disposed within the passage means to control fluid flow therethrough, the valve means being connected to the input rod, and a pressure outlet line from the working chamber. The fluid displacement multiplier is attached to the master cylinder and has at least one stepped housing chamber connected to a master cylinder fluid pressure outlet, the housing chamber having a stepped portion between small and large diameter sections thereof. A differential area piston is disposed within the chamber and has a shoulder extending between small and large diameter portions thereof, and a poppet valve disposed within the differential area piston. A multiplier fluid outlet communicates fluid pressure to an associated braking line. The pressure outlet line is connected to a variable volume chamber defined by the shoulder and small diameter portion of the piston and stepped portion of the housing so that when the vehicle operator steps on the brake pedal and activates the input rod, the fluid power apparatus is activated and the increased fluid pressure in the working chamber is communicated to the variable volume chamber to provide a pressure boost to the differential area piston which is activated by fluid pressure received from the master cylinder that is operated by the fluid power apparatus, thereby effecting an increase in the output pressure of the multiplier in addition to the enlarged fluid displacement effected thereby.

One way of carrying out the invention is described in detail below with reference to the accompanying drawings which illustrate an embodiment thereof, in which:

DESCRIPTION OF THE PREFERRED EMBODIMENT

Figure 1:
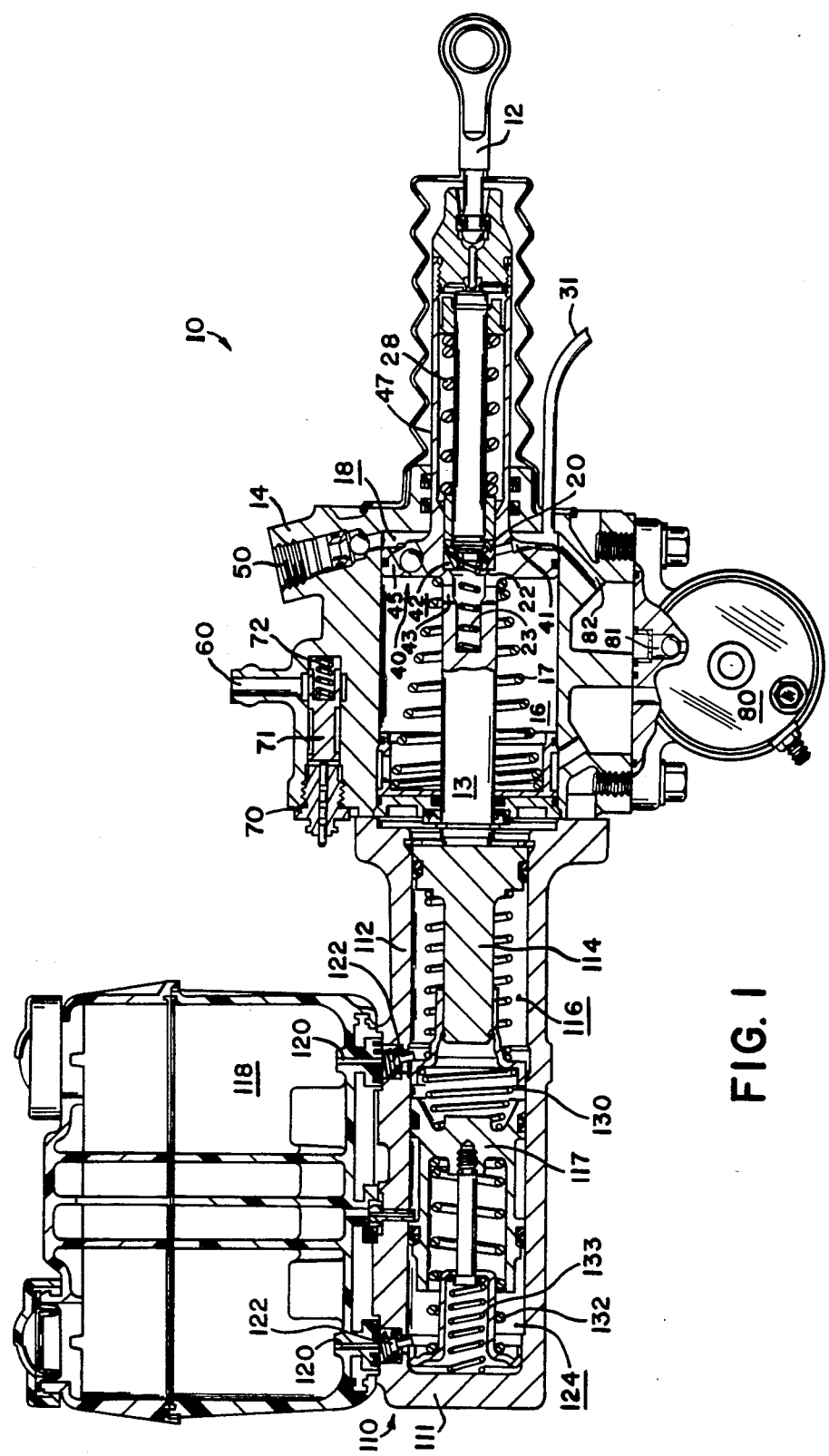
FIG. 1 is a section view of the fluid power apparatus and attached master cylinder.

The hydraulic power braking apparatus of the present invention comprises three basic components, a fluid power apparatus designated generally by reference numeral 10, a master cylinder 110, and a fluid displacement multiplier 210. The fluid power apparatus 10 is connected to and activates the master cylinder 110, the master cylinder 110 providing fluid pressure to the displacement multiplier 210 which provides an increased fluid displacement output to an associated brake circuit. The fluid power apparatus 10 includes a fluid pressure outlet line 31 connected between and providing fluid pressure from a working chamber to a variable volume chamber of multiplier 210 in order to provide a power or pressure boost to the piston of the multiplier, and thus effects an increase in fluid output pressure provided to the associated brake circuit in addition to the increased fluid volume displacement effected by the multiplier.

The fluid power apparatus 10 is illustrated in detail in FIG. 1. An input rod 12 is connected to the brake pedal of the vehicle, and has at one end thereof a valve seal 20 disposed adjacent the valve seat 22 of piston 40. The fluid power apparatus housing 14 defines a chamber divided by piston 40 into a first chamber 16 and a working chamber 18. The piston 40 includes a spring 23 biasing the valve seal 20 against input rod 12 and spring 28 biasing valve seal 20 toward valve seat 22. A return spring 17 engages at one end a wall of chamber 16 and at the other end the piston 40. Apparatus 10 includes a fluid power inlet 50 and a fluid power outlet 60, the inlet 50 being connected to the power steering apparatus and receiving fluid pressure therefrom. The fluid power apparatus may receive fluid pressure either from a power steering apparatus or from a dedicated pump provided therefor. Piston 40 includes inlet passage 41 communicating with chamber 42 and outlet 43 so that fluid pressure received through inlet 50 is communicated through passage 41, chamber 42, and outlet 43 to first chamber 16 which has at least one opening (not shown in the section view) communicating with the fluid power outlet 60. Fluid power outlet 60 includes flow switch 70 engaged by piston 71 biased toward switch 70 by spring 72. Attached to power apparatus 10 is an electric pump 80 which is operatively connected to the flow switch 70. Apparatus 10 includes a fluid pressure outlet line 31 connecting the working chamber 18 with the fluid displacement multiplier 210. Input rod 12 is received within extension 47 of piston 40, and extension 47 is integral with rod end 13 which engages the primary piston of the master cylinder 110. Piston 40 includes a backflow check valve 45 to provide pressure relief for any pressure buildup in first chamber 16.

Fluid power apparatus 10 receives through inlet 50 fluid pressure from either a power steering apparatus or a dedicated pump, the fluid pressure being communicated through passage 41, chamber 42, outlet 43, and first chamber 16 to fluid power outlet 60 when the brakes are not being applied and apparatus 10 is in the inactive position illustrated in FIG. 1. When the vehicle operator steps on the brake pedal, the input rod 12 is displaced longitudinally toward the left in FIG. 1, causing the valve seal 20 to engage valve seat 22 and prevent fluid flow through the piston 40 to first chamber 16. The buildup of fluid pressure in working chamber 18 causes a pressure differential between the chambers, and biases piston 40 to the left against return spring 17. This provides a fluid power boost to the displacement of input rod 12 by the vehicle operator, the fluid power boost assisting the vehicle operator in effecting operation of master cylinder 110. It should be clearly understood that the fluid power apparatus 10 may comprise any of numerous designs which effect a fluid power boost for the master cylinder. Such fluid power apparatuses have been previously disclosed in U.S. Pat. No. 3,967,536 entitled: "PNEUMATIC AND HYDRAULIC POWER BRAKE APPARATUS" assigned to the same assignee as the present invention, and wherein a fluid power apparatus is situated between a vacuum booster and a master cylinder in order to provide a hydraulic power boost for actuation of the master cylinder. Fluid power apparatus 10 further includes the electric pump 80 to provide the fluid pressure necessary for effecting operation of power apparatus 10 in case there is a failure of fluid pressure provided to inlet 50. If the fluid pressure to inlet 50 should fail, the fluid pressure communicated through outlet 60 would decrease accordingly and cause piston 71 to move and effect operation of fluid switch 70 which causes electric pump 80 to operate, electric pump 80 providing the necessary fluid pressure through inlet 81 and passage 82 to the working chamber 18. It should be noted that when the brakes are actuated and there is effected a buildup of fluid pressure in working chamber 18, the buildup of increased fluid pressure is communicated directly through fluid pressure outlet line 31 to the fluid displacement multiplier 210, as will be described in detail hereinafter.

Figure 2:
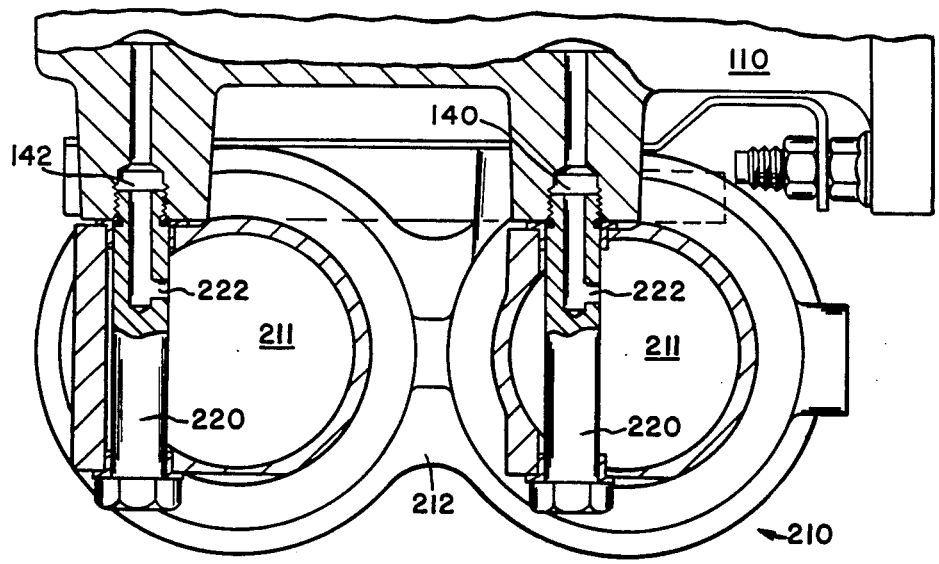
FIG. 2 is a top section view of the fluid displacement multiplier connected to the side of the master cylinder body.

Master cylinder 110 may comprise any standard master cylinder design. Master cylinder 110 includes a body 112 fastened to housing 14 of power apparatus 10, the piston input rod 13 abutting the primary piston 114 to effect displacement thereof. A reservoir 118 communicates via compensation ports 120 and valves 122 with the primary pressure chamber 116 and secondary pressure chamber 124. The pistons 114 and 117 are separated by spring 130 and secondary piston 117 is separated by springs 132 and 133 from end wall 111. Primary pressure chamber 116 and secondary pressure chamber 124 are connected with fluid pressure outlets 140 and 142, respectively (see FIG. 2). Fluid displacement multiplier 210 is connected with master cylinder 110 via bolts 220, each bolt 220 having a passage 222 providing fluid communication with the multiplier stepped chamber 211. Master cylinder 110 operates in a conventional manner, the master cylinder receiving a power boost from fluid power apparatus 10 during application of the braking system.

Figure 3:
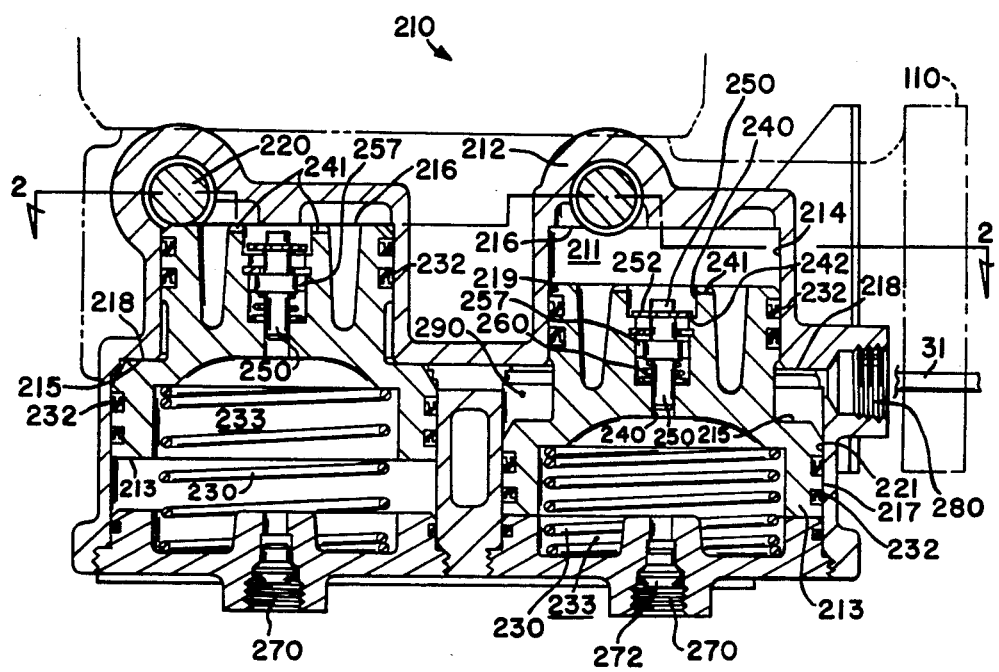
FIG. 3 is a section view of the fluid displacement multiplier connected to the side of the master cylinder body.

Fluid displacement multiplier 210 includes two chambers 211 having identical structural components therein, each chamber receiving fluid pressure from a respective pressure chamber of the master cylinder. Housing 212 has therein stepped chambers 211, each stepped chamber having a stepped portion 218 between a small diameter section 214 and a large diameter section 217. The stepped chamber 211 receives fluid pressure from the master cylinder by means of passage 222. Differential area piston 213 is disposed within chamber 211 and has a shoulder 215 located between a small diameter portion 219 and a large diameter portion 221. Spring 230 biases the piston toward bolt 220, however FIG. 3 illustrates the right side differential area piston 213 in a fully applied position in order to illustrate the variable volume chamber 290. Piston 213 includes seals 232 disposed about small diameter portion 219 and large diameter portion 221 in order to isolate small diameter section 214 of chamber 211 from large diameter section 217. Piston 213 includes a central through passage 240 having a valve seat 242 disposed adjacent valve seal 252 located on poppet valve 250. Poppet valve 250 is biased by spring 260 toward small diameter section 214 of stepped chamber 211, poppet valve 250 having vanes 257 which permit fluid flow from small diameter section 214 to large diameter section 217 via passage 240. Piston 213 includes transverse openings 241 to permit fluid flow into passage 240 when piston 213 is fully biased by spring 230 against the top wall section 216 of chamber 211 (left side FIG. 3). Multiplier 210 includes an outlet 270 connected with an associated braking circuit, a tube nut insert 272 located therein for engagement with a brake line of the circuit. Fluid pressure outlet line 31 is connected to inlet port 280 which communicates with variable volume chamber 290. Variable volume chamber 290 is defined by stepped portion 218 of chamber 211 and shoulder 215 and small diameter portion 219 of piston 213. Variable volume chamber 290 is isolated by seals 232 disposed about small and large diameter portions of piston 213.

When displacement multiplier 210 receives fluid pressure from the master cylinder via passages 222, the increased fluid pressure is communicated through passage 240 to portion 233 of chamber 211 and through outlet 270 to the associated brake circuit until a predetermined pressure is achieved in chamber 211. Upon occurrence of the predetermined pressure received from the master cylinder, poppet valve 250 is biased downwardly by the increased fluid pressure and causes valve seal 252 to engage seat 242 and fluidically isolate the small diameter section 214 of chamber 211 from the large diameter section 217. The continuing increase of fluid pressure in small diameter section 214 causes piston 213 to move downwardly against spring 230, causing a corresponding increased fluid volume displacement from enlarged section 217 and portion 233 through outlet 270 to the associated brake line. Thus, fluid displacement multiplier 210 receiving fluid pressure from master cylinder 110 effects the desired increase of fluid volume displacement communicated to the associated brake circuit. However, the increased fluid volume displacement communicated from enlarged diameter section 217 through outlet 270 will normally have a decreased pressure level. This is compensated for by fluid pressure received through line 31 which acts upon the variable volume chamber 290 to exert a force upon piston shoulder 215 and further boost the output pressure.

The power braking apparatus operates as follows: When the vehicle operator applies the brakes, the input rod 12 is displaced to the left to cause valve seal 20 to close valve seat 22 and effect a pressure increase in working chamber 18. The pressure increase in working chamber 18 results in a pressure differential between the chambers so that piston 40 is biased to the left to provide a fluid power boost for the actuation of master cylinder 110. As the master cylinder is being operated by fluid power apparatus 10, fluid pressure created in pressure chambers 116 and 124 is communicated via passages 222 to chambers 211 of fluid displacement multiplier 210. Upon reaching a predetermined pressure level within a respective chamber 211, poppet valve 250 closes and the increased fluid pressure in chamber 211 biases piston 213 downwardly to effect an increased fluid volume displacement through outlet 270 to the associated brake circuit. Simultaneously, the buildup of increased fluid pressure within chamber 18 of apparatus 10 is communicated through line 31 to variable volume chamber 290 where fluid pressure acts upon shoulder 215 to provide a fluid power boost for the displacement of differential area piston 213 downwardly toward outlet 270. Thus, a further boost is provided in the outlet pressure communicated through 270 by fluid pressure received from working chamber 18 of the power apparatus 10. Because fluid power apparatus 10 provides fluid pressure through line 31 that is proportional to the amount of vehicle braking required, the vehicle operator will be able to "feel" the booster pressure and modulate it accordingly. When the vehicle operator releases the brake pedal, the pressure within variable volume chamber 290 will immediately drop to zero as the fluid pressure in working chamber 18 is vented through passage 41, past valve seal 20, valve seat 22, and outlet 43 to chamber 16 and fluid power outlet 60. Simultaneously, the multiplier input pressure received in chambers 211 from the master cylinder via passages 222 will also decrease and differential area pistons 213 return to their released positions under the influence of output pressure in sections 217 and springs 230. As pistons 213 move to their at-rest positions, poppet valves 250 will open and allow compensation flow to occur.

The present invention provides the combination of increased volume displacement and increased output pressure for the associated braking circuits, without utilizing a larger size master cylinder than currently used. Thus, larger brake assemblies may be provided for on-road and off-road vehicles by utilizing a master cylinder assembly and fluid power apparatus for actuating the master cylinder, with the fluid power apparatus providing a fluid pressure boost to a fluid volume multiplier receiving pressure from the master cylinder and emitting an increased fluid volume to the larger size brake assemblies.

Although the present invention has been illustrated and described in connection with example embodiment, it will be understood that this is illustrative of the invention, and is by no means restrictive thereof. It is reasonably to be expected that those skilled in the art can make numerous revisions and additions to the invention and it is intended that such revisions and additions will be included in the scope of the following claims as equivalents of the invention.

We claim:

1. A power braking apparatus for a vehicle, comprising:
    a single master cylinder and a reservoir, the master cylinder having two pressure chambers with respective fluid pressure outlets;
    a fluid power apparatus connected with the master cylinder and comprising a housing, an input rod, a first chamber and a work chamber divided by a power piston, a spring biasing said power piston, a fluid power inlet communicating with said work chamber, a fluid power outlet communicating with said first chamber, passage means through said power piston, valve means connected to said input rod and controlling fluid flow through said passage means, and a fluid pressure outlet line from said working chamber; and
    a pair of fluid displacement multipliers each of which comprises at least one stepped housing chamber connected directly to a respective fluid pressure outlet of the single master cylinder, the housing chamber having a stepped portion between small and large diameter sections, a differential area piston having a shoulder between small and large diameter portions of the piston, poppet valve means associated with said differential area piston, an outlet to an associated brake circuit and for communicating fluid pressure received from the large diameter section of said housing chamber, and the fluid pressure outlet line of the fluid power apparatus providing fluid pressure to each multiplier which has a variable volume chamber defined by the shoulder and small diameter portion of the differential area piston and stepped portion of said housing chamber.

2. The power braking apparatus in accordance with claim 1, further comprising connecting members for securing said multipliers to said master cylinder, the connecting members each having an opening providing for fluid flow from the respective fluid pressure outlet to each of said stepped housing chambers.

3. The power braking apparatus in accordance with claim 2, wherein said poppet valve means is disposed within a through opening in the piston in order to close said through opening upon occurrence of a predetermined fluid pressure received from the master cylinder.

4. The power braking apparatus in accordance with claim 3, wherein each multiplier includes a return spring disposed within the large diameter section of said housing chamber and engaging at one end an end wall of said housing chamber and at the other end the large diameter portion of the differential area piston in order to return said differential area piston to an initial inactive position when a braking application ceases.

5. The power braking apparatus in accordance with claim 4, wherein said fluid power apparatus includes an electric pump and a fluid outlet pressure responsive switch associated with the fluid power outlet so that a failure of fluid pressure in the fluid power outlet is sensed by said switch which activates said pump to provide fluid pressure to the working chamber of said fluid power apparatus.

* * * * *